June 27, 1967 — A. A. EZRA — 3,327,801
SURFACE VEHICLE FOR TRAVERSING EXTREMELY RUGGED TERRAIN
Filed June 4, 1965 — 3 Sheets-Sheet 1

INVENTOR.
ARTHUR A. EZRA
BY
ATTORNEYS

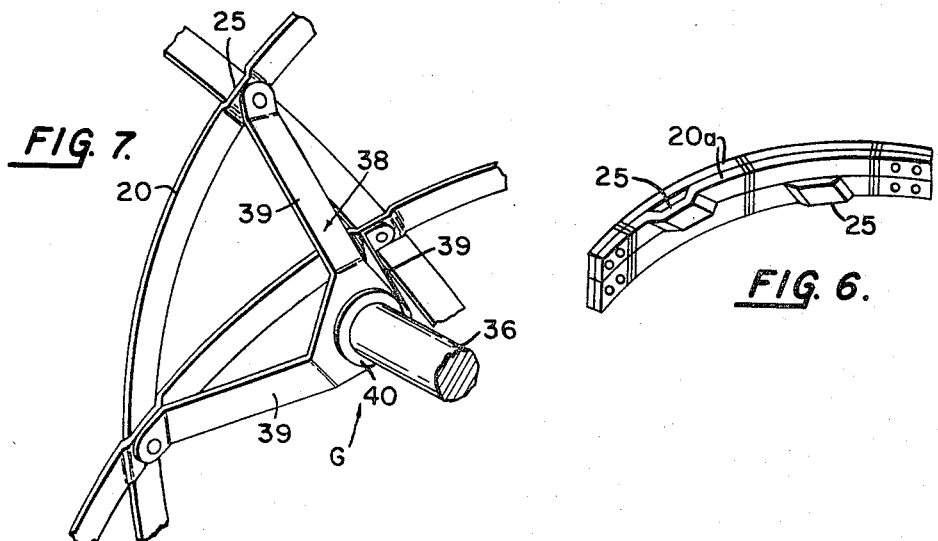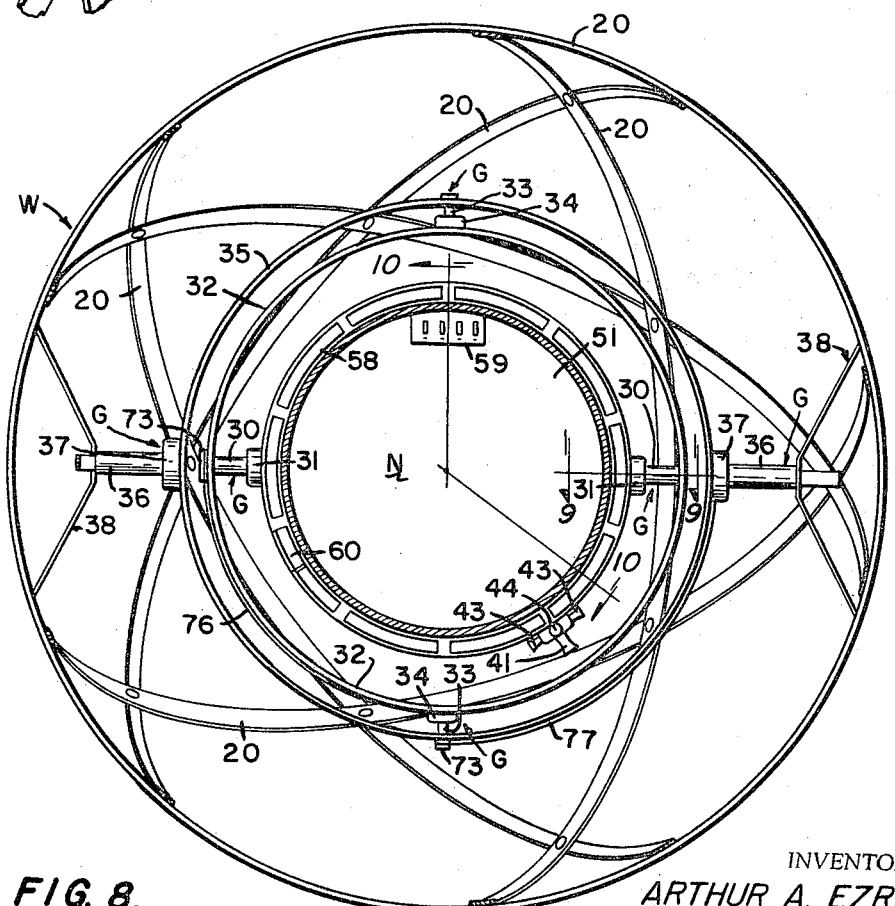

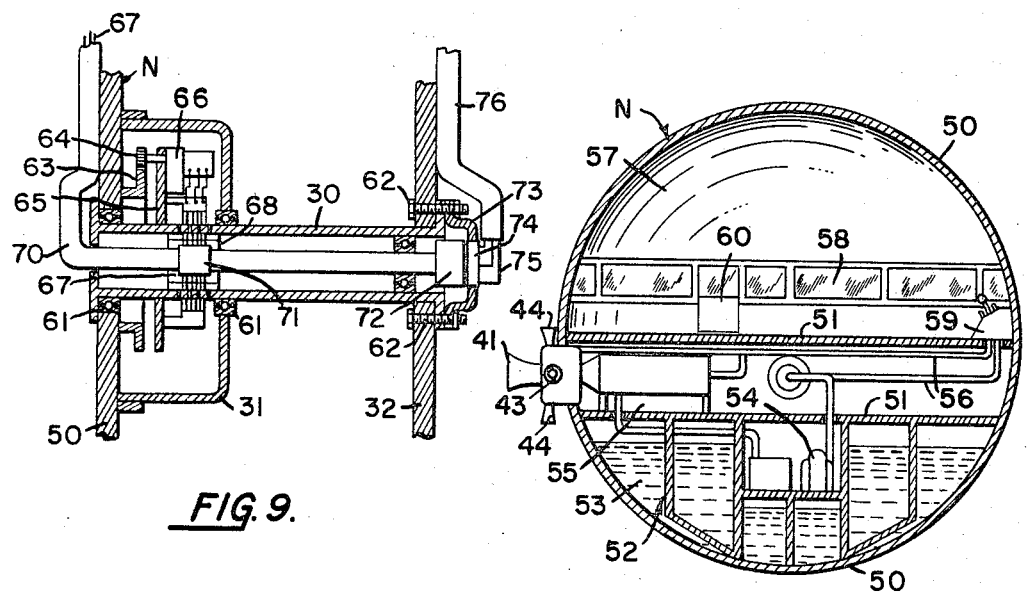
FIG. 9.
FIG. 10.
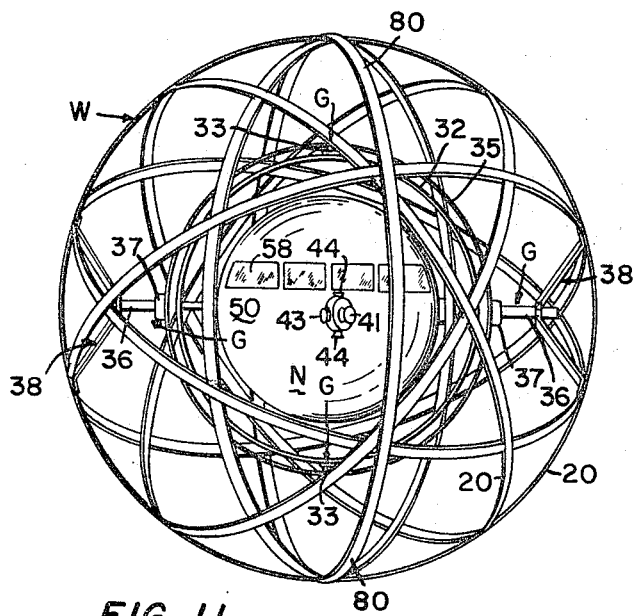
FIG. 11.
INVENTOR.
ARTHUR A. EZRA
BY
ATTORNEYS

United States Patent Office 3,327,801
Patented June 27, 1967

3,327,801
SURFACE VEHICLE FOR TRAVERSING
EXTREMELY RUGGED TERRAIN
Arthur A. Ezra, Littleton, Colo., assignor to Martin-Marietta Corporation, New York, N.Y., a corporation of Maryland
Filed June 4, 1965, Ser. No. 461,399
13 Claims. (Cl. 180—21)

This invention relates to self-propelled vehicles and more particularly to a vehicle having a nacelle encased within a spherical rolling member. Accordingly, the invention will be hereinafter referred to as a spherical vehicle and the rolling member referred to as a spherical wheel.

A primary object of the invention is to provide a novel and improved type of spherical vehicle which is especially adapted to traverse exceedingly rough terrain having crevasses and ravines, and as such, will find its primary use in exploratory work, as in glaciated country, upon polar ice caps and like country inaccessible by conventional vehicles, and also as a vehicle for traversing the surface of a celestial body, such as the moon, in connection with space exploration.

Another object of this invention is to provide a vehicle having a nacelle mounted on a two or three axis system in which the axes are mutually perpendicular, thereby permitting the nacelle to always remain in an upright position regardless of the amount of rotation or angular position or angular position of the spherical wheel within which it is encased, i.e., the nacelle cannot be overturned.

Another object of the invention is to provide a novel and improved construction of a spherical vehicle which is especially maneuverable over a rough terrain by being capable of promptly changing its direction of movement as the need arises.

Another object of the invention is to provide a novel and improved self-propelled vehicle which includes a nacelle swingably encased within a spherical wheel formed by an open lattice of tracking rims capable of providing a maximum degree of observation from the nacelle to better control the movement of the vehicle and facilitate the aligning of the nacelle in any selected direction, as when it is traversing a rough terrain.

A further object of the invention is to provide a novel and improved self-propelled, spherical vehicle which incorporates improved and simplified locomotion means capable of driving the vehicle over a rough, irregular course, of assisting the vehicle to traverse crevasses and ravines, and of lifting the vehicle over obstacles.

Another object of the invention is to provide a novel and improved self-propelled vehicle having a nacelle protectively encased within a spherical wheel, formed as a lattice of tracking rims which are especially capable of absorbing shocks encountered in traveling over rough, irregular terrain.

A further object of the invention is to provide a novel and improved self-propelled vehicle for traversing rough, irregular terrain, as for exploratory work, which may be transported to the site of use as a compact group of knocked-down components capable of being quickly and easily assembled at the site of use.

With the foregoing and other objects in view, all of which more fully hereinafter appear, my invention comprises certain constructions, combinations and arrangements of parts and elements as hereinafter described, defined in the appended claims and illustrated in preferred embodiments in the accompanying drawing, in which:

FIGURE 6 is a perspective view of a group of a few rim components packaged together, as to facilitate transportation of a knocked-down vehicle to the location where the vehicle is to be assembled.

FIGURE 7 is a fragmentary isometric view of the interior of the spherical wheel, and a portion of a gimbal support shaft attached to the wheel support rims, i.e., as taken from the indicated line 7—7 at FIG. 1, but on an enlarged scale.

FIGURE 8 is a diametric sectional plan view of the apparatus illustrated at FIG. 1, but with the nacelle supporting members, a gimbal system, being oriented to lie in the plane of the drawing.

FIGURE 9 is a fragmentary sectional detail of a rotation control mechanism within a shaft of the gimbal system, as taken from the indicated line 9—9 at FIG. 8, but on an enlarged scale.

FIGURE 10 is a transverse sectional elevational view of the nacelle of the vehicle as taken from the indicated line 10—10 at FIG. 8, but on a somewhat enlarged scale.

FIGURE 11 is a perspective view, similar to FIG. 1, but on a reduced scale and illustrating, in a somewhat diagrammatical manner, a modified arrangement of the spherical wheel to adapt it for more rapid travel over comparatively smooth terrain.

There is a need for an improved vehicle which is capable of traveling over very rough terrain, such as that encountered on glaciers where crevasses and ravines must be traversed. Also, in connection with space exploration, there is a need for an improved self-propelled vehicle which would be better capable of travel over any type of surface which might be encountered, such as the surface of the moon. One approach to the design and construction of such a vehicle is to provide large-diameter wheels, for the size of an obstruction which a vehicle is capable of moving over is directly related to the diameter of its wheels. As an ultimate, it has been proposed to provide a vehicle having its body portions encased within a large-diameter cylindrical or spherical wheel.

However, in the past, such vehicles have not been successful because of inadequate means of driving and controlling them especially over obstacles. The use of a spherical shell constituting a wheel, which could be effectively maneuvered in any direction, has been limited to amusement devices capable of being used only upon flat surfaces. Other constructions which appear to use such a principle are generally limited to travel along a given course in the manner of cylindrical shell.

The present invention was conceived and developed with the above considerations in view, and comprises, in essence, a self-propelled vehicle having the body portions constituting a nacelle mounted within a reticulated, spherical shell, a spherical wheel formed by a network of interlaced circular rims. This wheel is capable of rolling in any direction. The nacelle is supported upon an array of gimbals which are, in turn, mounted upon diametrically opposing shafts projecting inwardly from the spherical wheel.

The primary driver for this unit consists of a jet engine or like thrust reaction engine system, such as a propeller driving engine, mounted on the nacelle, having a radially-disposed force vector which will normally be directed through the center of the unit. A control system to rotate and change the position of the nacelle consists of smaller jet engines on the nacelle having tangentially-directed force vectors. A secondary driving and controlling system may also be provided by motorizing the several gimbal support shafts, and this latter system is useful for braking the vehicle and for rolling the spherical wheel over smooth grounds.

Figure 1:
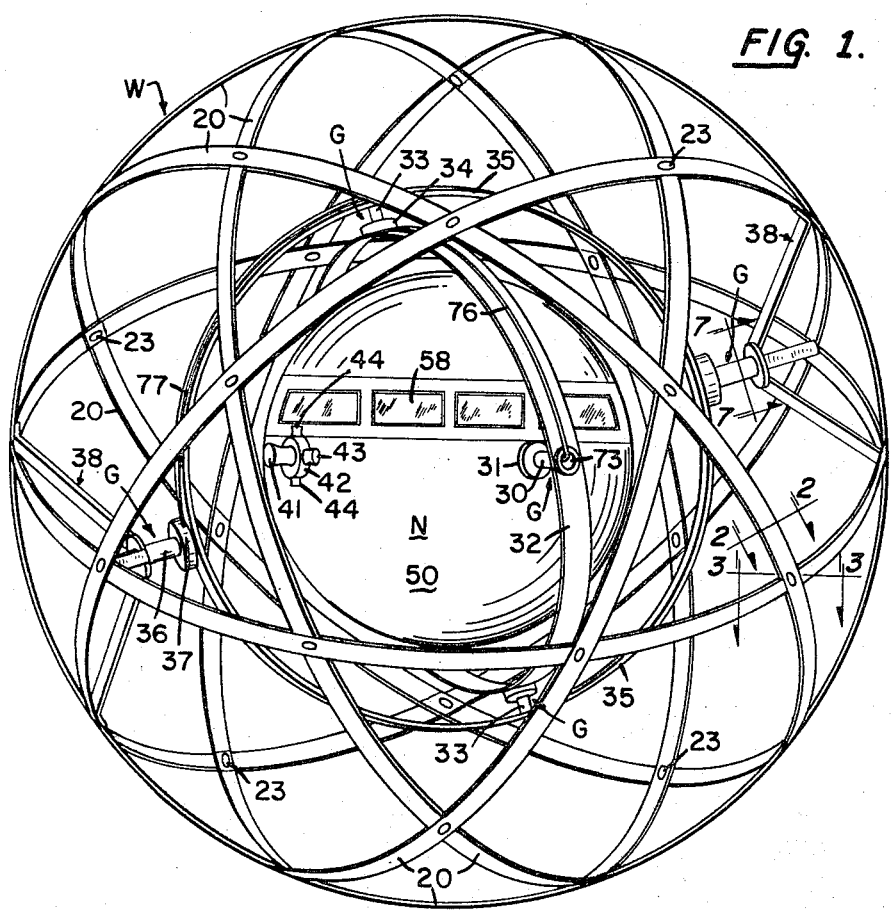
FIGURE 1 is a perspective view of the spherical vehicle in one of the many positions in which it may assume while in use.
Figure 2:
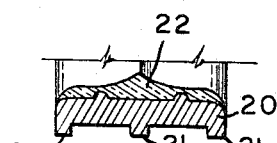
FIGURE 2 is a fragmentary transverse sectional view of a tracking rim of the wheel, as taken from the indicated line 2—2 at FIG. 1, but on an enlarged scale.

Referring more particularly to the drawing, the spherical wheel W is formed as a reticulated lattice by a plurality of hoop-shaped tracking rims 20 extending about the spherical surface of the wheel as major circles. In the arrangement illustrated at FIG. 1, or in any other arrangement, each rim is angled from the others, and each intersects with other rims in a regullar pattern, whereby the openings between the adjacent rims form an array of regular geometrical figures. In the FIG. 1 arrangement, an alternating array of regular spherical triangles and pentagons is a natural result of using six tracking rims, with any five being arranged about the sixth at 36-degree intervals, all in a symmetrical, even manner. However, it is to be understood that other arrays and arrangements of rims and even segments of rims may be used. Such may even be more desirable than the arrangement illustrated, especially where it is necessary to reduce the size of the openings of the spherical wheel to a minimum so that it may roll in a smoother manner, especially on a flat surface.

Each tracking rim 20 is constructed of a high-strength, lightweight metal having an outer surface longitudinally ribbed as at 21 to provide a better gripping contact with ground surfaces. If desired, these rims may also be transversely ribbed or even treaded as with rubber. The inner surface of each rim may be flat, ribbed as shown, or even flanged in any suitable manner to provide adequate structural bending strength. Where the vehicle is to be driven by a jet engine, this inner surface must be protectively coated, as with an ablative heat-resistant material 22.

Figure 3:
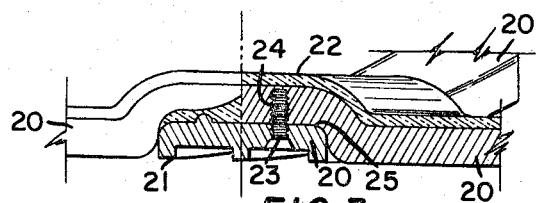
FIGURE 3 is a fragmentary sectional view illustrating one manner of interconnecting overlapping tracking rims, as taken from the indicated line 3—3 at FIG. 1, but on an enlarged scale.
Figure 5:
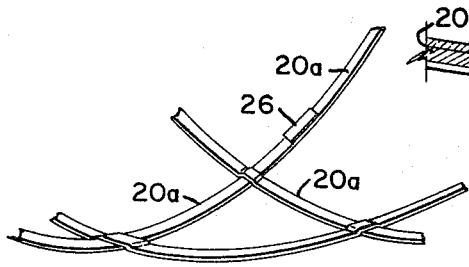
FIGURE 5 is a perspective view of a group of a few tracking rim components interlocked together, as in the commencement of an in situ assembly of the vehicle.

The points where any two rims overlap to form the lattice work of the wheel W may be interconnected as by suitable means, such as lock bolts 23 turned into sockets 24 in the rims. To facilitate smooth rolling action, the inward lapping rim may be formed with an inward offset 25 to receive the outer, as illustrated at FIG. 3. Each offset is angled in such a manner as to form a holding socket to lock one rim at the proper angle with respect to the other and to prevent excessive shearing stresses upon the bolts 23 when the wheel W is under load.

Figure 4:
FIGURE 4 is a fragmentary longitudinal sectional view illustrating one manner of forming a tracking rim by interconnecting individual components together.

The spherical wheel W is a large-diameter member, and may be three times the diameter of the nacelle or more. Accordingly, a wheel W capable of supporting a 20-foot-diameter nacelle may be as much as 60 feet in diameter. A wheel or even a single tracking rim this large is not suitable for shipment by ordinary transportation means, and it must be shipped as knocked-down sections and assembled at the site where it is to be used. Accordingly, each rim 20 may consist of individual arcuate segments 20a which are abutted together and interconnected in situ as by tie plates 26 bolted to the ends of each section as by bolts 23, as in the manner illustrated at FIG. 4. By forming the segment 20a as members of uniform size, a number of individual segments can be compactly packaged together for shipment, as in the manner illustrated at FIG. 6.

The nacelle N is positioned at the center of this spherical lattice and is preferable, but not necessarily, spherical or partially spherical in form. It is mounted in a system of gimbals G which have their axes intersecting at the spherical center of the wheel. It is contemplated that the nacelle will hang from the gimbal axes with machinery, fuel supplies and other heavy items being below the axes level to keep the nacelle upright, all as will be hereinafter further described.

Two inner gimbal shaft stubs 30 outstand from opposite sides of the nacelle N and are aligned on a common diametrical axis through the center of the nacelle. Each opposing shaft stub 30 is rotatably mounted in a supporting head 31 at the surface of the nacelle, and its outstanding end is securely connected to an inner gimbal ring 32 which embraces and swings about the nacelle responsive to rotation of the shaft stubs 30. The shaft stubs 30 are attached to the gimbal ring 32 at diametrically opposing positions, 180 degrees apart on the ring.

A second pair of shaft stubs 33 outstand from the ring 32 at diametrically opposing positions on a common axis which is positioned at 90 degrees or normal to the axis of the first mentioned shaft stubs 30. Each shaft stub 33 is rotatably mounted in a supporting head 34 on the ring 32, and its outstanding end is securely connected to an outer gimbal ring 35, and at diametrically opposing 180-degree positions on the ring.

A third pair of shaft stubs 36 outstand from the outer ring 35 at diametrically opposing positions, on a common axis which is positioned at 90 degrees or normal to the axis of the second mentioned shaft stubs 33. Each shaft stub 36 is rotatably mounted in a supporting head 37 on the ring 35, and its outstanding end is securely connected to a bracket 38 which, in turn, is affixed to the spherical wheel W to support the entire system within the wheel.

The bracket 38 is preferably formed, as in FIG. 7, with three arms 39 connecting to a central head portion 40 to which the shaft stub 36 is affixed. The extended end of each arm 39 is secured to a pair of tracking rims 20 at positions where a pair of rims overlap each other. Accordingly, the three arms 39 are proportioned to embrace a triangular opening of the rim pattern of the wheel, as in the manner shown at FIG. 7.

When the spherical wheel W is setting upon the ground at any given position, the nacelle N will be suspended within this wheel in an upright position with its vertical axis being established by the major portion of its weight being below the axis level of the nacelle. The gimbal system G will permit this nacelle to be rotated about a full circle while remaining in its upright position, regardless of the position assumed by the wheel. This results from the rotation of the outer ring 35 about the shafts 36, permitting the shafts 33, connecting the outer ring 35 and inner rings 32, to assume any selected inclination. At any selected inclination of shafts 33, the inner ring 32 may rotate to assume another correlated inclination where the shafts 30, connecting the inner ring 32 and the nacelle N, lie horizontally, in a specific direction. Rotation of the shafts 30 about a horizontal plane is thus accomplished by the combined rotation of the rings about the several shafts. At the same time, the nacelle rotates on shafts 30 to remain veritcal.

Conversely, the nacelle may remain upright and oriented in any selected direction while the wheel W commenced to rotate, and will remain so directed regardless of the direction in which the wheel rolls. Furthermore, the freedom of action between the nacelle and the wheel, permitted by the gimbal support G, will permit the nacelle to be turned to any given direction to control rolling the wheel in such direction, and as the wheel is rolled and maneuvered over rough terrain, the nacelle may change direction to the movement of the wheel.

It is contemplated that the vehicle may be rolled from one position to another in discrete movements. Normally, when at rest, the wheel will be setting over a triangular or pentagonal opening between the rims. When the wheel is then rotated, it will then be lifted upon and over a rim 20 and drop to set over an adjacent opening. While such mode of movement would not be desirable in a smooth road, it is especially suitable for traversing rough terrain. Each discrete movement may be in any selected direction, and the nacelle may be easily oriented to drive the spherical wheel as desired.

The primary driving means for the vehicle consists of one or more jet or propeller type engines which are mounted upon the wall of the nacelle to outstand from the nacelle at a selected position intermediate of shaft stubs 30. Such an engine is indicated at 41 as being a jet engine. Regardless of the type of engine used, fuel for the engine, or engines, will be carried within the storage compartment of the nacelle.

Where a jet engine is used, the blast of the jet 41 will create a thrust, and the force vector will extend substantially through the centroid of the nacelle gimbal support system to balance the nacelle against rotation or tipping. This jet blast will be normally directed through the openings between the track rims, and while a portion of the jet blast may strike a track rim from time to time, such will not appreciably reduce its effective thrust. Moreover, the ablative coating on the inner face of the rims 20 will protect them from becoming overheated.

Where the vehicle is to be used as in space exploration to traverse a planetoid, such as the moon, or other celestial body, it may be driven by jet engines which use liquid oxygen for burning of the fuel, or even solid fuel rockets. Such fuel will necessarily be stored in the nacelle and aside from a more complex control system which need not be described herein, the overall operation will be substantially similar to terrestrial operations.

The jet engine 41 will ordinarily be positioned at a fixed location on the nacelle and will be directed outwardly and radially from the centroid of the system. However, it is contemplated that this engine may be shiftably mounted on the nacelle to be moved to several positions, as along an equator of the nacelle. It may also be swiveled in a mounting case 42 in a manner which permits direction of the thrust action to be changed when necessary to balance the inertial effects of loads in the nacelle. Other jet arrangements may be used, for example, a plurality of engines may be mounted on the nacelle and located at several positions, in a manner not shown, to provide for more versatile movements of the vehicle, especially when it is being lifted.

In addition to the main driving jet 41, oppositely-directed supplementary jets 43 are aligned on each side of the main jet to effect tangential thrust to rotate the nacelle about its vertical axis and other supplementary jets 44 are located above and below the main jet to tip the nacelle when desired.

The resulting movement of the vehicle is highly flexible, and the wheel is capable of rolling in any direction by maneuvering the nacelle. The main jet engine 41 is preferably sufficiently powerful to actually lift the vehicle upwardly, as out of a ravine or over a cliff, and with such arrangement, the vehicle will be fully capable of traveling across any type of rugged terrain.

The nacelle N, as in FIG. 10, consists of an enclosed body shell 50 which is preferably spherical in form, as illustrated. This shell 50 is divided into internal compartments arranged in vertical levels by decks 51. A lower level 52 is arranged to provide fuel compartments 53 and a power generating compartment 54, it being desired to locate the very heavy items at this lower level and below the gimbal system to keep the nacelle in an upright position.

An intermediate level 55, at the equatorial section of the nacelle, will include the jet motors 41, 43 and 44 and a control system indicated by ducts 56. Also, lightweight supplies, not shown, may be stored at this level. An upper level 57 will constitute the passenger compartment. As such, it will include windows 58, an operator control panel 59, shown also in FIG. 8, and other items and fixtures, not shown, as will be required for living in the nacelle for substantial periods of time when necessary. A suitable exit door 60 and other access hatches, not shown, are provided to facilitate movement from one level of the nacelle to another.

An alternate driving and braking arrangement to supplement the jet motors is provided by motorizing the gimbal system. This arrangement requires that at least one of each of the pairs of stub shafts 30, 33 and 36 be motorized by individual drive means, each of which must be operated independently of the operation of the others. However, the drive means on each drive shaft may be similar to the others, and the drive arrangement, illustrated in longitudinal section at FIG. 9, showing the drive shaft 30 outstanding from the wall of the nacelle N, is also exemplary of the drives on shafts 33 and 36. This shaft 30 is a hollow member. Its inner end is held in position within spaced bearing journals 61 at the nacelle and at the supporting head 31. The outer end of the shaft is flanged and secured to the inner gimbal ring 32 by bolts 62.

A driving and braking means within the driving head 31 includes a gear ring 63 which is affixed to the nacelle and a motor system affixed to the shaft 30 to drive a pinion 64 intermeshing with the gear ring. This motor system includes a mounting flange 65 secured to the shaft 30 and a suitable motor-reducer unit 66 attached to the flange and having its output shaft carrying the pinion 64.

Power leads 67 extend to a commutator ring 68 within the hollow shaft 30, as will be further described. A desirable braking means for holding the shaft 30 may be provided within the motor-reducer unit 66, such being a common arrangement, and the brake may lock automatically to hold the pinion 64 against rotation whenever the motor is not in operation, or it may be controlled by varying an electrical current within the motor, such being a common practice. However, should it appear desirable, an independent braking system, not shown, may be mounted upon the flange 65 to lock against the face of the gear ring 63 in any suitable conventional arrangement.

The electrical power system to drive this motor is controlled at the panel 59 in the nacelle, and the leads from this panel and from power generating equipment within the nacelle extend to a rigid conduit 70 which axially extends through the shaft 30. This conduit remains fixed with respect to the rotation of the shaft 30 and a cylindrical commutator head 71 is provided on this unit to engage with the commutator ring 68 to connect selected leads 67 within the conduit through the commutator and to the motor drive 66. Other leads carried within this rigid conduit 70 bypass the commutator head and extend to the outer end of the shaft 30 to a terminal commutator head 72. The end of the shaft is closed by a cap 73 which carries a commutator plate 74 adapted to engage with the commutator head 72, and leads 75 extend from this plate to be encased in a rigid conduit 76 carried on the gimbal ring 32.

It follows that as the shaft 30 rotates to rotate the gimbal ring 32, the electrical circuits extending from the nacelle to the motor drive 66 and to the conduit on the gimbal ring will be in continuous engagement through these commutators.

The conduit 76 on the inner gimbal ring 32 extends arcuately about this ring through a 90-degree arc to the shaft stub 33 outstanding from that ring and thence turns into that shaft stub to a driving arrangement within the supporting head 34 and a connective arrangement at the outer gimbal ring 35 substantially the same as that above described. By a commutator arrangement, the same as that described, the leads extending through the shaft stub 33 are continued to extend into a conduit 77, as in FIG. 1, carried on the outer gimbal ring which extends through a 90-degree arc and to the shaft stub 36 to terminate in the supporting head 37 on that shaft stub.

Should it be desirable, each pair of shaft stubs outstanding from the nacelle and from the gimbal rings may include such motor units which will be driven in unison with the other, in which case the circuit arrangements will be substantially identical to that heretofore described, although bifurcated at the commutation points on the gimbal rings.

It is contemplated that this driving system may be used in connection with the jet driving means to assist in properly orienting the nacelle whenever a discrete movement of the nacelle by the jet is anticipated. The drive may also be used to assist in braking and holding the vehicle as on a slope. The nacelle may be tipped to produce an unbalanced weight on the wheel W, which is adequate to prevent the vehicle from rolling down a slope. However, where steep slopes are encountered, such may be insufficient to restrain the vehicle, in which case the jet 41 may have to be used.

The mechanical drive for this vehicle is especially useful where the vehicle is traversing comparatively level terrain whenever such happens to be encountered, and this drive may be preferably in the interest of fuel economy. Where it is anticipated that substantial reaches of comparatively level terrain may be encountered, it may be desirable to drive the vehicle at comparatively high speeds. For such, the vehicle may be equipped with an auxiliary track rim 80, illustrated at FIG. 11, which extends circumferentially about the spherical vehicle at an equator normal to the axis of the outer shaft stubs connecting with the wall of the spherical wheel. Rotation about this auxiliary track rim will thus be dynamically balanced, for the several gimbal supports may be brought together so that the shaft stubs 30 and 36 are on a common axis.

Another alternate arrangement of the spherical vehicle is possible by the elimination of one of the gimbal rings and a pair of stub shafts. With elimination of the inner ring 32, for example, and the interconnection of the shafts 30 to the outer ring 35 at the normal location of the shaft stubs 33, the wheeled vehicle may rotate to any position, with the nacelle remaining in proper horizontal and vertical alignment. However, the direction of the nacelle is restricted, and to compensate for such effect, it will be necessary to provide means for rotating the jet engine 41 about the equator of the nacelle.

While I have now described my invention in considerable detail, it is obvious that others skilled in the art can build and devise alternate and equivalent constructions, which are nevertheless within the spirit and scope of my invention. Hence, I desire that my protection be limited, not by the constructions illustrated and described, but only by the proper scope of the appended claims.

What is claimed is:

1. A vehicle adapted to traverse rough terrain, comprising:
   (a) a spherical wheel formed as a diverse array of overlapping rims to constitute a generally-reticulated wheel surface adapted to roll in any selected direction from a given position;
   (b) a pair of diametrically-opposed brackets mounted within the wheel adapted to support shaft members thereon;
   (c) a gimbal means within the wheel, including an outer ring and an inner ring, with said inner ring being interconnected to said outer ring by a pair of intermediate shaft stub means mounted on one diametrical axis, a pair of inwardly-directed shaft stub means being connected to said inner ring on a diametrical axis normal to the axis of the intermediate shaft stub means, and a pair of outstanding shaft stub means on a diametrical axis normal to the axis of said intermediate shaft stub means, said outstanding shaft stub means being connected to said brackets;
   (d) a nacelle carried within the gimbal means and being connected to said inward shaft stub means; and
   (e) a driving means associated with the nacelle adapted to drive the wheel.

2. In the vehicle set forth in claim 1, wherein the rims on said wheel are formed as great circles of its spherical configuration.

3. A vehicle adapted to traverse rough terrain and comprising:
   (a) a spherical wheel formed as a regular diverse array of overlapping rims arranged as great circles in a generally reticulated pattern to constitute a wheel surface adapted to roll in any selected direction from a given position;
   (b) a pair of diametrically-opposed brackets mounted within the wheel adapted to support axially aligned shaft members therein;
   (c) a gimbal means within the wheel, including a first ring having a pair of outstanding shaft stubs at a diametrical axis, which are connected to said brackets, a pair of intermediate inward shaft stubs at a diametrical axis normal to the first said axis and a second ring inwardly of said first ring connected to said intermediate shaft stubs at a diametrical axis thereof, and having an inward pair of shaft stubs mounted on a diametrical axis normal to the intermediate said pair;
   (d) a nacelle within the gimbal means connected to said inward shaft stubs, whereby the nacelle may be oriented to any selected position to remain thus regardless of the movement of the wheel, through compensative rotation of the gimbal rings about the respective shafts; and
   (e) means associated with the nacelle adapted to drive the wheel.

4. In the vehicle set forth in claim 3, wherein said driving means includes a motor at one of each of the outer, intermediate, and inward stub shafts adapted to, respectively, rotate the inner gimbal ring with respect to the nacelle, to rotate the outer gimbal ring with respect to the inner ring and to rotate the wheel with respect to the outer ring.

5. In the vehicle set forth in claim 3, wherein the driving means constitutes a reaction motor mounted upon the nacelle.

6. In the vehicle set forth in claim 3, wherein the nacelle includes a lower section, an intermediate section and an upper section, with the heavier components thereof being in the lower section beneath the axis of the inward shaft stubs supporting the nacelle, whereby the nacelle tends to remain in a substantially upright position.

7. In the vehicle set forth in claim 3, wherein the nacelle comprises a spherical body divided into a lower, intermediate and an upper level by deck sections, with the shaft supports being at the intermediate level at the normally horizontal equator of the nacelle.

8. In the vehicle set forth in claim 3, including a primary rim formed as a great circle about the wheel, whereon the vehicle is adapted to travel when on comparatively level ground.

9. In the vehicle set forth in claim 3, including a primary rim about a great circle of the vehicle wheel which lies in a plane normal to the shaft members connecting the wheel to the gimbal means, whereby to permit the vehicle to travel on the primary rim over comparatively smooth ground, with the system being substantially, dynamically balanced.

10. In the vehicle set forth in claim 3, wherein one of said rims is offset at the intersection with another of said rims so that the outer surface of all of said rims lie in the same sphere.

11. In the vehicle set forth in claim 3, including ribs on the outer surface of said rims and a coating of ablative material on the inner surface of said rims.

12. A vehicle adapted to traverse rough terrain, comprising:
   (a) a spherical wheel formed as a diverse array of overlapping rims to constitute a generally-recticulated wheel surface adapted to roll in any selected direction from a given position;
(b) a pair of diametrically-opposed brackets mounted within the wheel adapted to support shaft members thereon;
(c) a gimbal means within the wheel, including a ring having a pair of outstanding shaft stub means at one diametrical axis and a pair of inwardly-directed shaft stub means at another diametrical axis, with the outstanding shaft stub means being connected to said brackets;
(d) a nacelle carried within the gimbal means and being connected to said inward shaft stub means; and
(e) an engine for producing reaction thrust mounted on said nacelle adapted to drive said wheel.

13. A vehicle adapted to traverse rough terrain, comprising:
(a) a spherical wheel formed as a diverse array of overlapping rims to constitute a generally-recticulated wheel surface adapted to roll in any selected direction from a given position;
(b) a pair of diametrically-opposed brackets mounted within the wheel adapted to support shaft members thereon;
(c) a gimbal means within the wheel, including a ring having a pair of outstanding shaft stub means at one diametrical axis and a pair of inwardly-directed shaft stub means at another diametrical axis, with the outstanding shaft stub means being connected to said brackets;
(d) a nacelle carried within the gimbal means and being connected to said inward shaft stub means; and
(e) a jet engine associated with the nacelle adapted to drive said wheel.

References Cited
UNITED STATES PATENTS

| | | |
|---|---|---|
| 1,265,496 | 5/1918 | Pare. |
| 1,905,345 | 4/1933 | Dandini. |
| 2,267,254 | 12/1941 | Reilley _____ 180—21 |
| 2,372,043 | 3/1945 | Agnides _____ 115—1 X |

FOREIGN PATENTS 1,255,440  1/1961  France.

BENJAMIN HERSH, *Primary Examiner.*
RICHARD J. JOHNSON, *Examiner.*